United States Patent [19]
Dorn et al.

[11] Patent Number: 5,665,451
[45] Date of Patent: Sep. 9, 1997

[54] TEXTILE INSERT FOR PRODUCING A FIBROUS COMPOSITE MATERIAL AND FIBROUS COMPOSITE MATERIAL COMPRISING SUCH A TEXTILE INSERT

[75] Inventors: Michael Dorn, Frick, Switzerland; Harald Engels, Mönchengladbach, Germany

[73] Assignee: Textilma AG, Hergiswil, Switzerland

[21] Appl. No.: 481,250

[22] PCT Filed: Oct. 6, 1994

[86] PCT No.: PCT/CH94/00200

§ 371 Date: Jun. 12, 1995

§ 102(e) Date: Jun. 12, 1995

[87] PCT Pub. No.: WO95/10405

PCT Pub. Date: Apr. 20, 1995

[30] Foreign Application Priority Data

Oct. 12, 1993 [CH] Switzerland ............... 3071/93

[51] Int. Cl.$^6$ ...................... B32B 3/12
[52] U.S. Cl. ...................... 428/116; 442/205
[58] Field of Search ............... 428/116, 225, 428/226, 232, 233, 257, 292; 442/205

[56] References Cited

U.S. PATENT DOCUMENTS

| | | |
|---|---|---|
| 3,217,752 | 11/1965 | Sutcliffe . |
| 4,729,860 | 3/1988 | Leach ........................ 264/103 |
| 5,021,281 | 6/1991 | Bompard et al. ............. 428/116 |
| 5,085,252 | 2/1992 | Mohamed et al. ........... 139/22 |
| 5,132,070 | 7/1992 | Paul et al. ................... 264/258 |
| 5,236,020 | 8/1993 | Sakatani et al. ............ 139/384 R |

FOREIGN PATENT DOCUMENTS

| | | |
|---|---|---|
| 385236B | 8/1984 | Austria . |
| 0056351 | 1/1982 | European Pat. Off. . |
| 0285705 | 12/1987 | European Pat. Off. . |
| 0279585 | 2/1988 | European Pat. Off. . |
| 0281130 | 3/1988 | European Pat. Off. . |
| 0299309 | 7/1988 | European Pat. Off. . |
| 0361796 | 9/1989 | European Pat. Off. . |
| 0422293 | 10/1989 | European Pat. Off. . |
| 0382240 | 2/1990 | European Pat. Off. . |
| 0514718 | 5/1992 | European Pat. Off. . |
| 1248005 | 8/1967 | Germany . |
| 2032423 | 1/1971 | Germany . |
| 3812909 | 4/1989 | Germany . |
| 2112439 | 4/1990 | Japan . |
| 4119146 | 4/1992 | Japan . |
| 4289243 | 10/1992 | Japan . |
| 542379 | 1/1942 | United Kingdom . |
| 2013130 | 12/1978 | United Kingdom . |
| PCT/GB/90/ 01671 | 11/1990 | WIPO . |

OTHER PUBLICATIONS

"Strengthening Composites in Three Dimensions", Advanced Materials & Processes, Sep. 1985, pp. 46–50, John C. Bittence.

"Dreidimensionale Faserverstarkungen fur Verbundwerkstoffe", Kunststoffe 79 (1989) 11, 1989, pp. 1228–1230, W. Bottger, Kulmbach.

"Dreidimensionale Verstarkungsmaterialien fur Faserverbundwerkstoffe", Dunststoffe 80 (1990) 9, 1990, pp. 1003–1007, F. Horsch, Ulm.

Dreidimensionale Textilien rationalalisieren die Herstellung von Faserverbundwerkstoffen, Kunststoffe 81 (1991) 11, 1991, pp. 1027–1031, B. Wulfhorst et al.

Primary Examiner—James J. Bell
Attorney, Agent, or Firm—Hovey, Williams, Timmons & Collins

[57] ABSTRACT

A textile insert consists of two layers ($S_1$, $S_2$) composed each of at least one partial layer ($S_{1a}$, $S^{1b}$, $S_{2a}$, $S_{2b}$). These layers are made of woven warp threads ($1_{1a}$, $1^{1b}$, $1_{2a}$, $1_{2b}$) and woof threads ($2_{1a}$, $2^{1b}$, $2_{2a}$, $2_{2b}$). Intermediate layers ($Z_1$, $Z_2$, $Z_3$) made of standing threads ($4_1$, $4_2$, $4_3$) that extend at least in the longitudinal direction X lie between the partial layers. The whole system is held together by straight or curved connecting threads ($3_1$, $3_2$). A stable textile insert is thus obtained that allows fibrous composite materials to be produced without distortion by a pultrusion process. Sections made of such fibrous composite materials are in addition highly resistant in all three directions.

13 Claims, 5 Drawing Sheets

TEXTILE INSERT FOR PRODUCING A FIBROUS COMPOSITE MATERIAL AND FIBROUS COMPOSITE MATERIAL COMPRISING SUCH A TEXTILE INSERT

BACKGROUND OF THE INVENTION

1. Field of the Invention

The invention concerns a textile insert for producing a fibrous composite material in accordance with the pultrusion or extrusion process as well as such a fibrous composite material.

2. Description of the Prior Art

Producing fibrous composite materials, i.e. sections of fiber-reinforced plastics, in accordance with the pultrusion or extrusion process is known, as, for instance, from the EP-OS's 0 281 130, 0 382 240 and 0 514 718. In them, highly resistant fiber bundles in the form of rovings are drawn through a matrix material in the form of a resin bath and formed out in a heated nozzle and hardened. These fibrous composite material sections have high resistance in a longitudinal direction. Their transverse resistance, i.e. the resistance transverse to the direction of the longitudinal axis of the fibers, is extremely limited. In order to eliminate these disadvantages, in addition to the unidirectional rovings, additional layers in the form of bonded fabric or woven ribbons are applied, which are to effect a reinforcement in the transverse direction, as evident, for example, from EP-OS 0 285 705. It is also known to deform hose-type fabrics into sections, which are additionally covered by ribbons, as shown by U.S. Pat. No. 5,132,070. All the processes have two essential disadvantages, which have hitherto been standing in the way of their large-scale technical application.

Firstly, it is very involved and/or expensive to move such textile inserts, precisely at the right place and without any distortion, through the pultrusion nozzle. While being drawn, the ribbons additionally applied for reinforcement are displaced relative to the unidirectional core composed of the rovings and cause rejects.

Secondly, the sections thus produced show, during stress by bending and torsion moments, little resistance perpendicular to the plane of the textile layers. This results in delamination, i.e. the rupture of the layers, and low values for the interlaminar shear strength of the section.

The object of the invention consists in creating a textile insert by means of which fibrous composite materials can be produced in accordance with the pultrusion or extrusion process and in providing appropriate composite materials, which do not have the mentioned disadvantages.

The object is achieved in accordance with the invention by:

a) a textile insert in accordance with as disclosed herein; and b) the fibrous composite material in accordance with as disclosed herein.

The fundamental techniques in producing woven ribbons, such as, for example, the production of hoses, auto safety belts, load and lashing straps and similar, are essentially known, such as, for example, from H. W. Kipp; "Bandwebtechnik" (ribbon weaving technology), Verlag Sauerländer, publishers, 1988, Chapter 5: "Bindungen für Hohl-, Doppel- und Mehrfachgewebe" (connections for hollow, dual and multiple fabrics). For the cost-effective production of such ribbon fabrics, needle-looms, which form a solid fabric edge on both edges of the fabric, are particularly suitable.

As a result of the multilayered build-up, in which, moreover, all the layers are connected to each other at least via partial areas, and as a result of the arrangement of standing threads running in a horizontal direction, the textile insert has a mechanical resistance, which allows the distortion-free processing of the textile insert in the pultrusion or extrusion process. Moreover, additional reinforcing supports are no longer required. Because additionally, the textile insert can be prefabricated, coiled and held in intermediate storage as a semifinished product in continuous form, the pultrusion and/or extrusion process is also simplified because the involved and/or expensive and error-prone assembly of threads and covering layers hitherto common becomes superfluous.

The textile insert thus consists of a mixture of genuine fabric layers with intersecting warp and weft threads and mats of the incorporated standing threads. As a result, a compact slip-resistant build-up is achieved, which can be well manipulated and processed. Mats alone are not slip-resistant and are hard to store, manipulate and process further. As a result of the build-up of the textile insert in accordance with the invention, the textile inserts as well as the later fibrous composite materials can be produced almost endlessly and, therefore, also in a particularly economical manner.

From the combination of fabric and mat result, in a fibrous composite material, particularly good resistance characteristics so that such a fibrous composite material can, even during rupture, absorb great forces in all three directions, thus, in addition, particularly avoiding the risk of delamination. Mats alone do not have any resistance in a transverse direction. Fabrics or other textile structure types (braiding, knits, wrappings and similar) alone produce insufficient resistances or excessive elongation.

Advantageous enhancements of the textile inserts are described in Claims 2 through 10.

Particularly advantageous enhancements of the textile inserts are described in the Claims 2 and 3, which can be processed into preferred stable fiber composite materials. Particularly advantageous, for this purpose, is an enhancement in accordance with Claim 4.

The threads can, in accordance with Claim 5, consist of various materials. Advantageous, however, is an enhancement in accordance with Claim 6. Materials that are suitable are, for example, glass, aramid or carbon fibers. Expedient is an enhancement in accordance with Claim 7 so that such a textile insert can be processed directly, without any preceding immersion phase, into a matrix material using the pultrusion or extrusion process.

A particularly advantageous enhancement of the textile insert is described in Claim 8 which allows a particularly versatile shaping of the section of the fibrous composite material to be produced. The embodiment in accordance with Claim 9 allows producing fibrous composite materials having a hollow section.

Sample embodiments of the object of the invention are described in more detail hereinafter based on the drawings, the following being presented:

BRIEF DESCRIPTION OF THE DRAWINGS

FIG. 1 shows the build-up of a multilayered textile insert with thread orientations in the three main directions—longitudinal direction X=warp direction, transverse direction Y=weft direction, and Z=connection direction. The textile insert comprises two layers $S_1$ and $S_2$, each of which comprises at least one partial layer but which, in the present example, is built up of partial layers $S_{1a}$, $S_{1b}$, $S_{2a}$, $S_{2b}$. Each partial layer comprises, warp threads $1_1$, $1_2$ running in longitudinal direction X and weft threads $2_1$, $2_2$ running in transverse direction Y which are interwoven. Between the two layers $S_1$ and $S_2$, on the one hand, and the partial layers $S_{1a}$, $S_{1b}$ and $S_{2a}$, $S_{2b}$ on the other hand, in each case, intermediate layers $Z_1$, $Z_2$, $Z_3$ are arranged, which are formed by straight standing threads $4_1$, $4_2$, $4_3$ running in longitudinal direction X and by standing threads $6_1$, $6_2$, $6_3$ running in transverse direction Y. The individual layers can be connected to each other by straight connecting threads $3_1$ (FIG. 1a) and/or connecting threads $3_2$ (FIG. 1b) that are undulated. Depending on the requirements for the fibrous composite material, not all the thread systems will be needed; in particular, the portion of the standing threads $4_1$, $4_2$, $4_3$ running in the direction of the warp can be increased at the expense of other thread systems, for example that of the standing threads $6_1$, $6_2$, or $6_3$ that run in transverse direction Y. The resistance can also be influenced by an appropriate selection of the pretension of the standing threads. This results in greater resistance and less elongation in longitudinal direction X. The textile insert and, as a consequence, also the fibrous composite material produced from it can thus be optimally adjusted to a specific application.

FIG. 2 shows a textile insert composed of the two main layers $S_1$ and $S_2$, which are composed of, for example, of the partial layers $S_{1a}$ and $S_{1b}$ as well as $S_{2a}$ and $S_{2b}$, the partial layers being connected by means of connecting threads $3_3$ in connection direction Z. The two layers $S_1$, $S_2$ are connected, in a center area A by means of connecting threads $3_1$ and by the edges C by means of the connecting threads $3_4$. From such a textile insert, a dual-T-section in accordance with FIG. 3 can, for example, be produced, with a bridge 7 from center section A and traversing legs 8, 9 of thickness D, which corresponds to thickness D of the textile insert, and width F, which essentially corresponds to the length of unconnected Section B of the layers $S_1$ and $S_2$.

FIG. 4 shows a textile insert, again composed of the two layers $S_1$ and $S_2$ with the partial layers $S_{1a}$, $S_{1b}$ and $S_{2a}$, $S_{2b}$, which are not connected to each other by their longitudinal edges $C_1$. The fibrous composite material section produced from this textile insert is presented in FIG. 5. In this case, the dual T-shaped section again has a center bridge 7 of thickness D, which corresponds to thickness D of the textile insert. The length of bridge A corresponds to the connected central partial section A of the textile insert. The traversing legs $8_1$ and $9_1$ have a width $F_1$, which corresponds approximately to double the length of the unconnected section B of the layers. Thickness $D_1$ of these bridges is equal to half of thickness D of the textile insert.

FIG. 6 shows examples of different section shapes, in which the fibrous composite material can be produced.

Figure 1A:
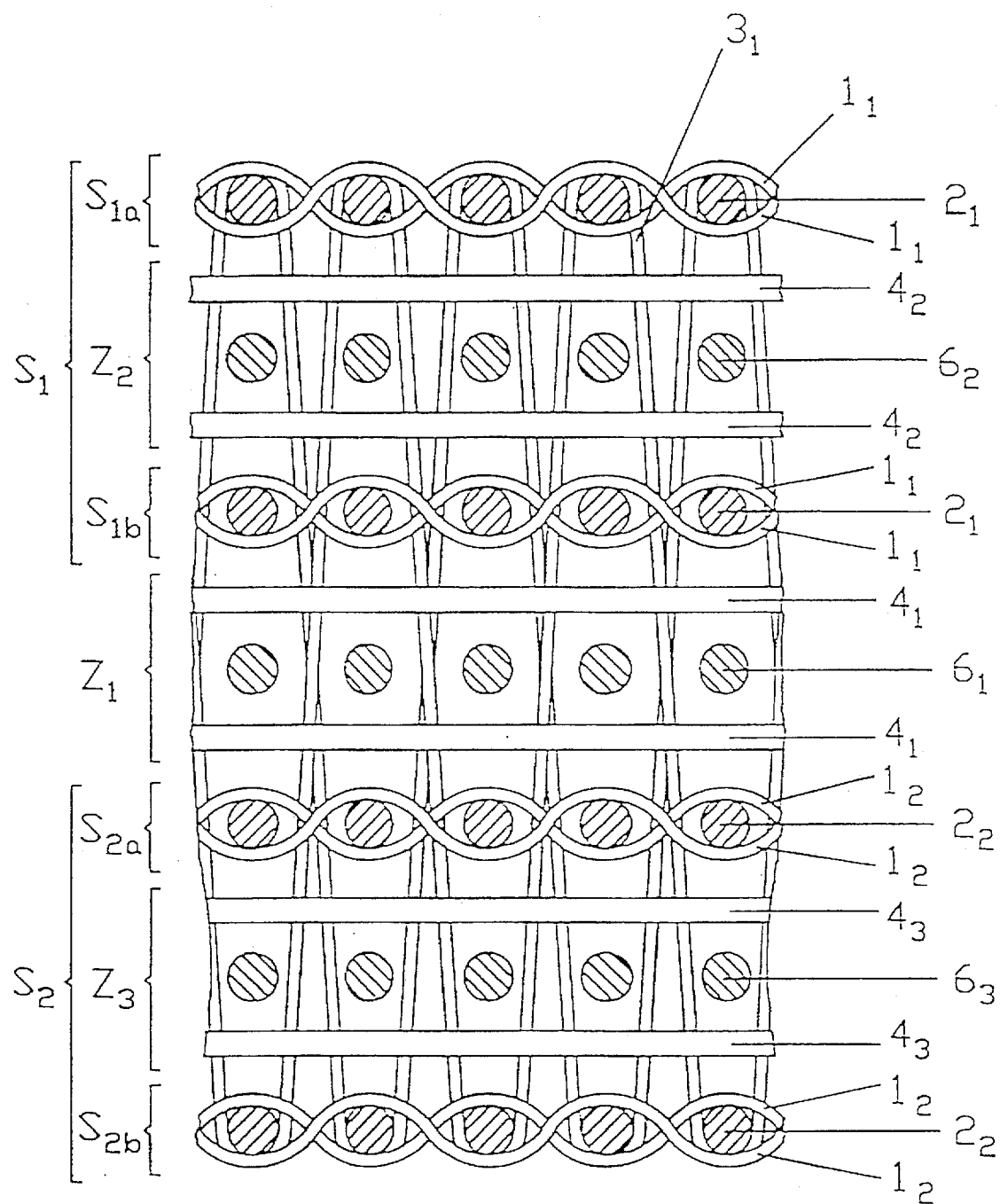
FIG. 1a a textile insert with straight connecting threads, in a cutout and in a cross section.
Figure 1B:
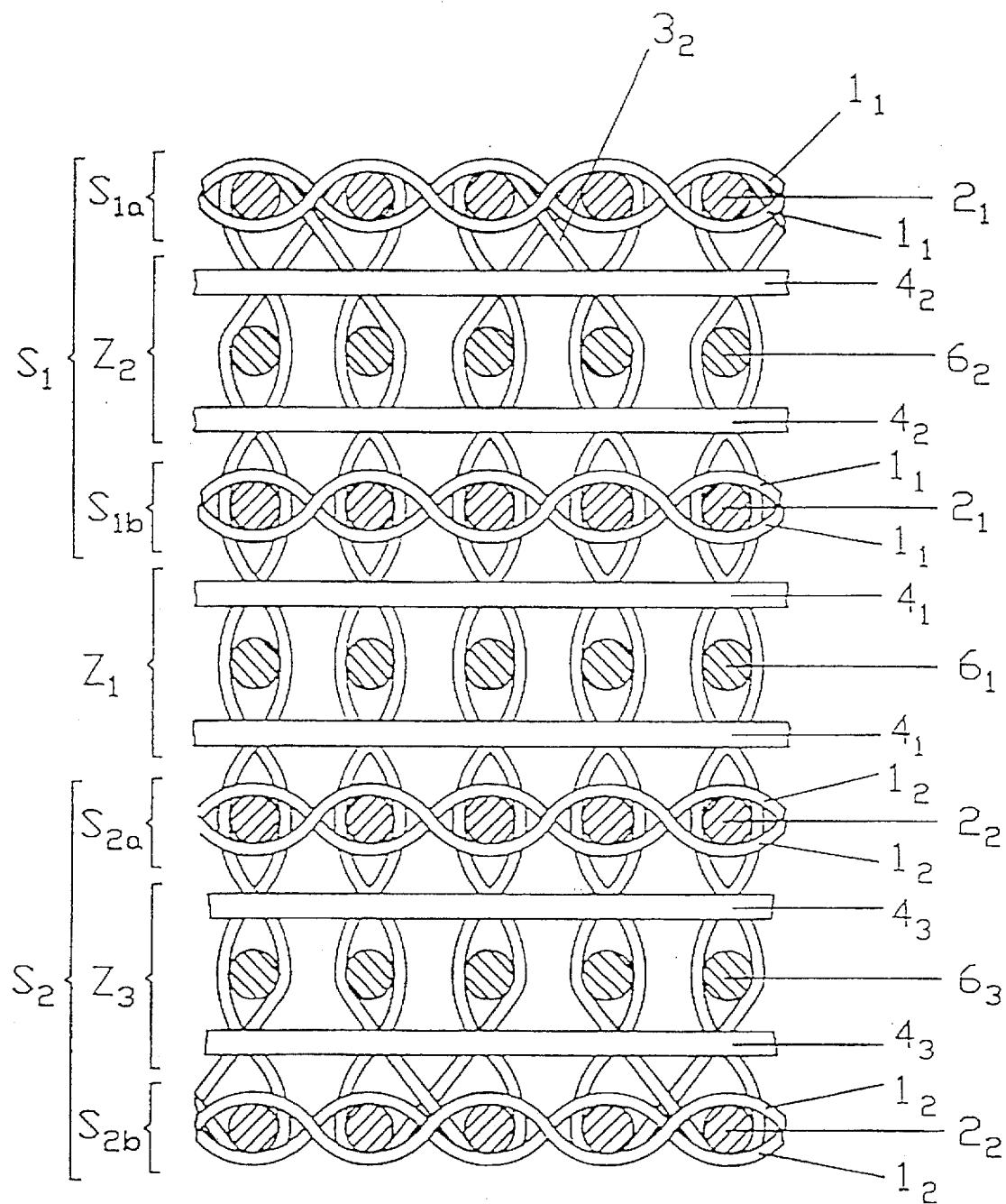
FIG. 1b a textile insert in analogy to FIG. 1a but with the connecting threads undulated.
Figure 2:
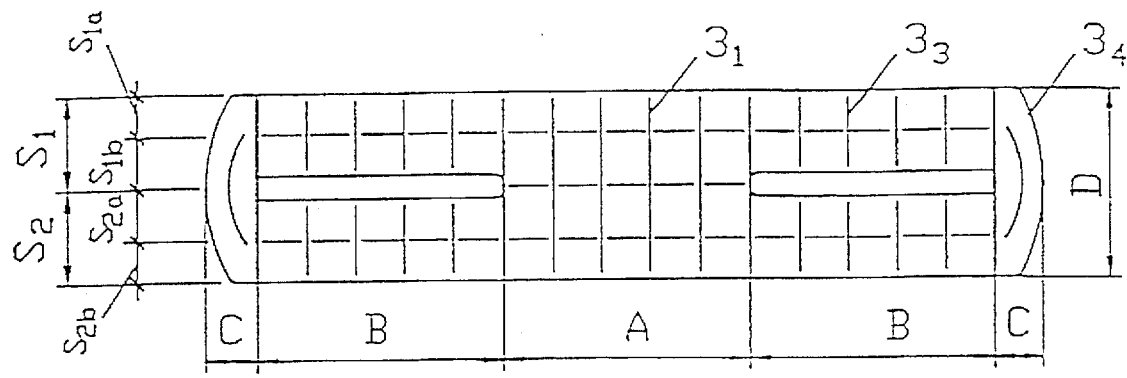
FIG. 2 a textile insert of two layers, which are connected to each other by the longitudinal edges, too, in a transverse view and in a schematic representation.
Figure 3:
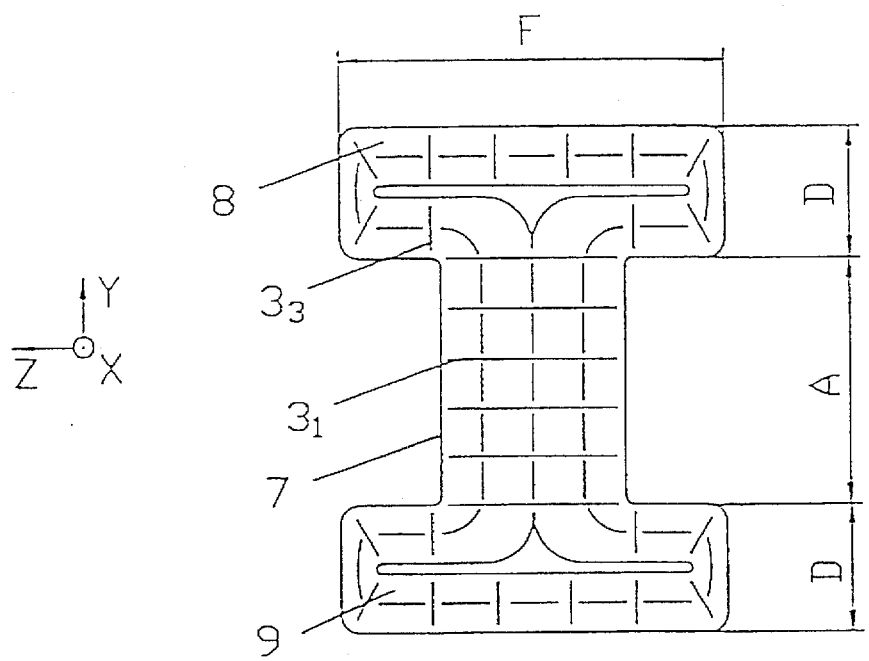
FIG. 3 a fibrous composite material from a textile insert in accordance with FIG. 2 in a transverse view.
Figure 4:
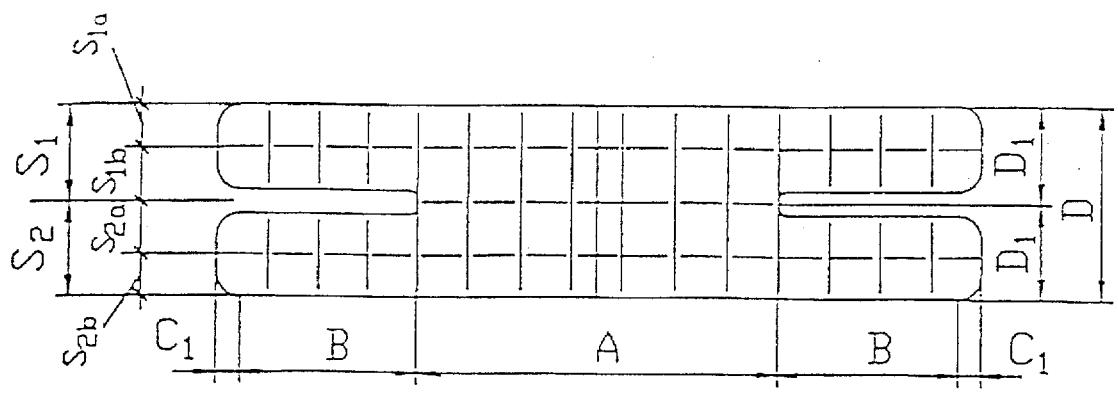
FIG. 4 a textile insert of two layers, the outer longitudinal edges of which are not connected to each other, in a transverse view and in a schematic representation.
Figure 5:
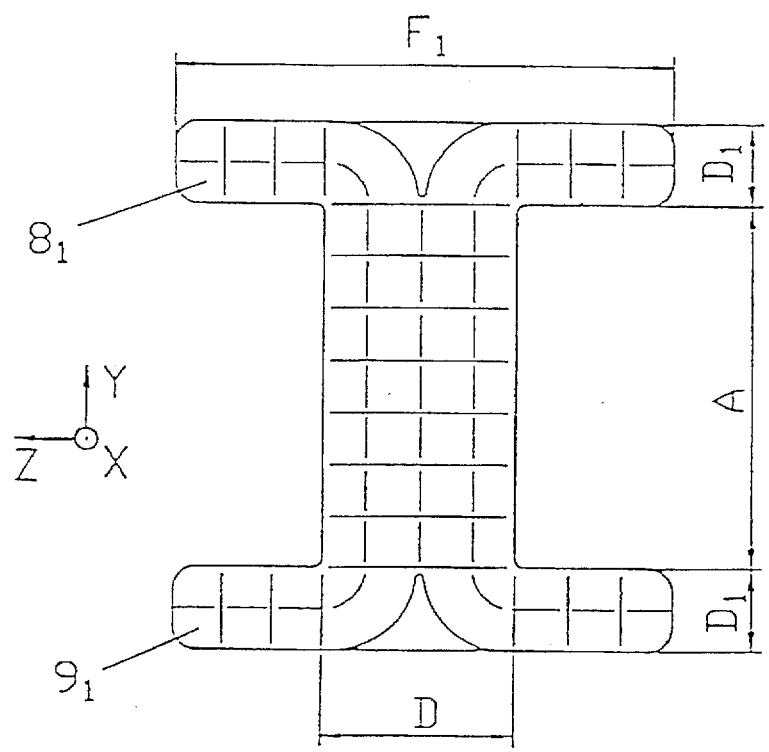
FIG. 5 a fibrous composite material of a textile insert in accordance with FIG. 4.
Figure 6:
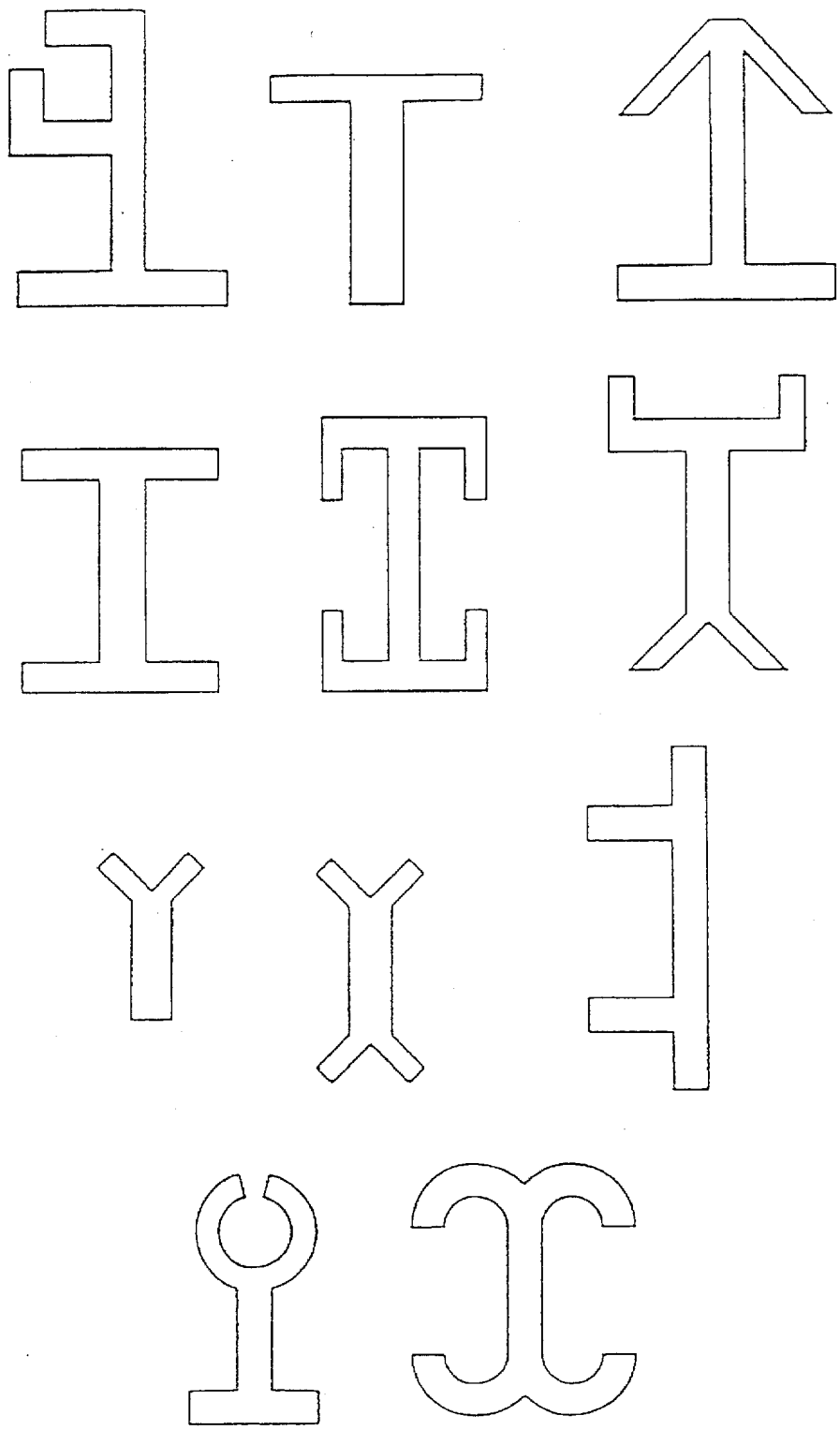
FIG. 6 fibrous composite materials of various cross section shapes.

The thickness of the textile insert and, as a result, the wall thickness of the fibrous composite material section produced from it is affected by the number of the layers as well as by the number of the thread systems and, in each case, the thread thickness and thread density within each thread system. In a four-layer fabric of glass fibers of a thickness of 408 tex, with a weft density of 3×8 wefts/cm, with a thread density of the warp thread system of 80 threads/cm, with a thread density of the connecting thread system of 4.5 threads/cm and a thread density of the standing thread system of 80 threads/cm, a thickness D of approx. 7 mm or a leg thickness $D_1$ of 3.5 mm results, measured on the finished fibrous composite material. The fabric thickness prior to producing the section is approx. 10% greater.

REFERENCE NUMBER LIST

A Partial area connected
B Partial area not connected
C Longitudinal edges connected
$C_1$ Longitudinal edges unattached
D Thickness of layer
$D_1$ Thickness of partial layer
F Width of leg
$F_1$ Width of leg
$S_1$ Layer
$S_{1a}$ Partial layer
$S_{1b}$ Partial layer
$S_2$ Layer
$S_{2a}$ Partial layer
$S_{2b}$ Partial layer
X Longitudinal direction (warp thread run)
Y Transverse direction (weft thread run)
Z Connection direction (connecting thread run)
$1_1$ Warp
$1_2$ Warp
$2_1$ Weft
$2_2$ Weft
$3_1$ Connecting thread in connection direction Z
$3_2$ Connecting thread in connection direction Z
$3_3$ Connecting thread in connection direction Z
$3_4$ Connecting thread in connection direction Z
$4_1$ Standing thread in longitudinal direction X
$4_2$ Standing thread in longitudinal direction X
$4_3$ Standing thread in longitudinal direction X
$6_1$ Standing thread in transverse direction X
$6_2$ Standing thread in transverse direction Y
$6_3$ Standing thread in transverse direction Y
7 Bridge
8 Leg
$8_1$ Leg
9 Leg
$9_1$ Leg

We claim:

1. A band-shaped textile insert for producing a fiber composite material according to the pultrusion or extrusion process including at least two woven layers, each layer comprising interwoven warp threads running in a longitudinal direction and weft threads running in a transverse direction, said two woven layers being only connected to each other across one or more areas of their cross section by means of connecting threads oriented in a connection direction and further comprising a system of standing threads running in a longitudinal direction, the two woven layers being separable from each other and deformable at areas that are not connected to each other.

2. Textile insert in accordance with claim 1, wherein each layer is formed of at least one partial layer arranged parallel to the partial layer of the other layer and comprising interwoven threads interconnected by means of said connecting threads in said connection direction.

3. Textile insert in accordance with claim 2, wherein at least between said individual layers and said partial layers, an intermediate layer is arranged comprising the standing threads running in a longitudinal direction and standing threads running in a transverse direction.

4. Textile insert in accordance with claim 3, characterized by the fact that said standing threads are substantially straight.

5. Textile insert in accordance with claim 1 wherein the threads of the individual thread systems consist of different materials.

6. Textile insert in accordance with claim 1 wherein the threads of all thread systems consist of the same highly resistant material.

7. Textile insert in accordance with claim 1 wherein the threads of at least one of the thread systems are provided with a matrix material.

8. Textile insert in accordance with claim 1 wherein each of said layers presents an outer longitudinal edge and adjacent layers are not connected to each other by their respective outer longitudinal edges.

9. Textile insert in accordance with claim 1 wherein each of said layers presents an outer longitudinal edge and adjacent layers are connected to each other at their respective outer longitudinal edges by means of a connecting thread oriented in said connection direction.

10. Textile insert in accordance with claim 1 wherein said insert is produced on a needle ribbon loom.

11. Fibrous composite material, which comprises, in a matrix material, a textile insert in accordance with claim 1.

12. A textile insert in accordance with claim 6, wherein said highly resistant material is glass.

13. A textile insert as set forth in claim 7, wherein said matrix material is a thermoplastic synthetic resin.

* * * * *